Sept. 27, 1927.  H. A. MEYER  1,643,721
CARCASS SPLITTER
Filed July 21, 1927
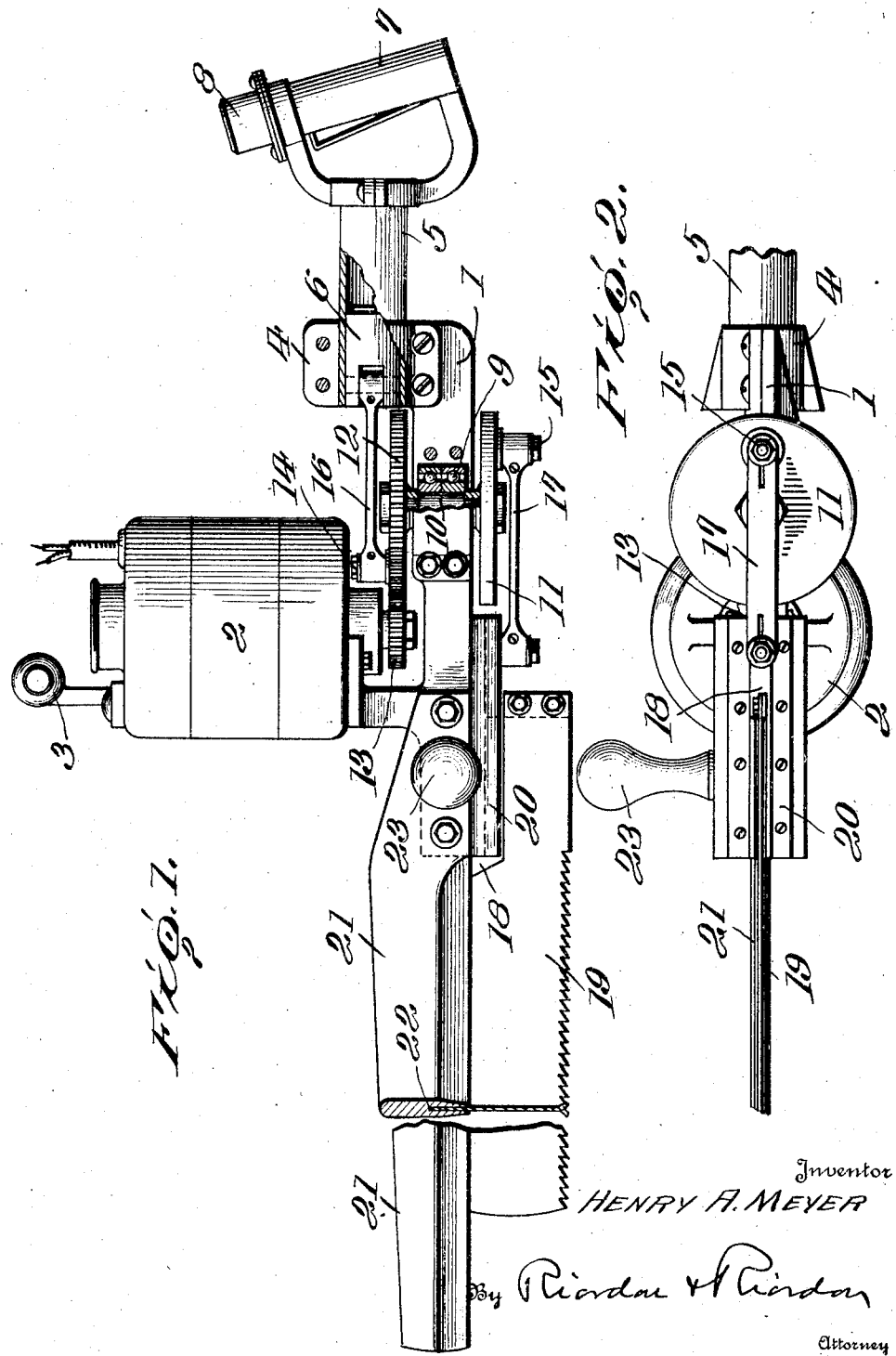
Inventor
HENRY A. MEYER
By Riordan & Riordan
Attorney Patented Sept. 27, 1927.

1,643,721

UNITED STATES PATENT OFFICE.

HENRY A. MEYER, OF CINCINNATI, OHIO, ASSIGNOR TO THE WOLF MACHINE COMPANY, OF CINCINNATI, OHIO, A CORPORATION OF OHIO.

CARCASS SPLITTER.

Application filed July 21, 1927. Serial No. 207,455.

In the packing house industry it is customary to suspend a carcass head downward on a trolley for convenience in dividing, and the carcass is divided longitudinally into two halves by sawing from the rump downward for a distance of about one foot, and then splitting the remaining length by the use of a cleaver. Machines have been heretofore provided for cutting through the rump bone but the splitting of the remainder of the carcass is effected by hand cleaving, and the object of the present invention is to provide a power-driven saw which may be easily controlled and by the use of which the splitting of the carcass may be expeditiously accomplished, and hand-cleaving made unnecessary.

Incidental objects will appear in the course of the following description, and the invention resides in certain novel features which will particularly be pointed out in the appended claims.

In the accompanying drawings, Figure 1 is a side elevation, partly broken away and in section, of one embodiment of the invention, and Figure 2 is a bottom plan view.

In carrying out the invention, there is provided a bracket or frame bar upon which is an electric motor 2 of any known or approved form, the frame being provided above the motor with a suspending device 3. At one end of the frame is secured a bracket 4 from which extends a preferably tubular guide and support 5 for a counterweight 6, a hand grip 7 being carried by the rear end of the guide and a thumb-actuated switch or circuit-closer 8 being mounted on the hand grip for starting and stopping the motor. Intermediate the ends of the frame, a bearing 9 is provided thereon to journal a shaft 10 which carries a crank disk 11 at its lower end and has a gear 12 secured to its upper end, said gear meshing with a pinion 13 on the armature shaft of the motor. On the upper side of the gear 12 is a wrist pin 14 and on the lower side of the crank disk 11 is a wrist pin 15, the two wrist pins being at diametrically opposite points with respect to the shaft 10. A pitman 16 connects the wrist pin 14 with the counterweight 6 and a pitman 17 connects the wrist pin 15 with a head 18 secured to the rear end of the saw blade 19. The head 18 is slidably supported by and between the parallel ways 20 which are secured to the frame 1 at the forward end thereof and the saw extends forwardly from the head as shown. Secured to and projecting forwardly from the front end of the frame, above the ways 20, is a saw guide arm and back 21 which is constructed in its lower edge with a longitudinal groove receiving the upper or back edge of the saw, as shown at 22. A handle 23 is provided at the rear end of the saw back and guide and projects laterally whereby the operator may easily hold the saw to its work.

It will be seen at once that the rotary motion of the motor shaft is converted into reciprocatory motion of the saw and the counterweight, and that the saw and counterweight always move in opposite directions so that the saw is nicely balanced and will work easily and evenly. The saw is about thirty inches long in order to cut through the thickness of the carcass, and it is about four inches high in order to cut entirely through a vertebra, and cause the latter to split and permit the guide to follow through the cut. The guide and back is of steel and as thin as possible in order to easily pass through the cut and it is of elliptical cross-sectional contour for the same reason. It will be noted tha the saw guide and back not only guides the saw but effectually reinforces the same and prevents bending and buckling thereof. The size and weight requires efficient counterbalancing, especially when working at about 1,000 strokes per minute, and I have attained this end by providing a double crank action, one crank driving the saw and the other crank driving the counterweight. This arrangement also economizes space and minimizes the bulk of the machine without any loss of efficiency. In actual practice a cover is provided to house the driving parts, but it has been omitted from the drawing for the sake of clearness.

Having thus fully described my invention, what I claim as new and desire to secure by Letters Patent is:

1. In a carcass-splitting machine, the combination of a frame, a saw blade, means on the frame for reciprocating the saw, a rigid arm projecting from the frame and substantially coextensive in length with the extent of movement of the blade, and having a longitudinal groove in its lower side receiving and directly guiding the saw blade.

2. In a carcass-splitting machine, the combination of a frame, a saw supported on the frame and projecting from one end thereof and longitudinally spaced from said saw, a counterweight mounted on the opposite end of the frame, and means on the frame for simultaneously moving the saw and the counterweight in opposite directions.

3. In a carcass-splitting machine, the combination of a frame, a saw blade mounted at one end of the frame, a counterweight slidably mounted at the opposite end of the frame and longitudinally spaced from said saw, a shaft on the frame, oppositely disposed cranks driven by said shaft and connected one with the counterweight and the other with the saw, and means for rotating the shaft.

4. In a carcass-splitting machine, the combination of a frame, parallel ways on the underside of the frame, an arm projecting from the frame above the ways, a head slidably supported by and between the ways, a saw blade secured to the head and slidably engaged in said arm through the major portion of its movement, and means on the frame to reciprocate the head and the saw.

5. In a carcass-splitting machine, the combination of a frame, a tubular guide projecting from one end of the frame, a counterweight slidably fitted in said guide, a saw slidably mounted at the opposite end of the frame, and means on the frame for simultaneously moving the saw and the counterweight in opposite directions.

6. In a carcass-splitting machine, the combination of a frame, a motor thereon, a shaft mounted on the frame between the ends thereof, a gear on the upper end of the shaft driven directly from the motor, a wrist pin on said gear, a crank disk on the lower end of the shaft, a wrist pin on the crank disk and arranged diametrically opposite the first-mentioned wrist pin, a saw at the front end of the frame, a pitman connecting the saw and the second-mentioned wrist pin, a counterweight slidably mounted at the rear end of the frame, and a pitman connecting the first-mentioned wrist-pin and the counterweight.

7. In a carcass-splitting machine, the combination of a frame, a saw at one end of the frame, a counterweight at the opposite end of the frame and longitudinally spaced from said saw, a frame suspending element therebetween, and means for moving the saw and the counterweight in opposition.

8. In a carcass-splitting machine, the combination of a frame, a saw blade slidable in said frame and directly guided thereby throughout the greater portion of its movement, and means to counterbalance said saw.

9. In a carcass-splitting machine, the combination of a frame, a reciprocating cutter on said frame, a counterweight on said frame, longitudinally spaced from said saw, and gears to said cutter, and means for moving said cutter and counterweight in opposition.

10. In a carcass-splitting machine, the combination of a frame, a cutter, means on the frame for reciprocating the cutter, a rigid arm projecting from the frame and having a longitudinal groove in its lower side for receiving and guiding the cutter through the major portion of its extent of movement, thereby to reinforce the cutter and prevent buckling thereof, a counterweight on the frame, and means for moving said cutter and counterweight in opposition.

11. In a carcass-splitting machine, the combination of a support, a cutter mounted to reciprocate at one side of said support, a counterweight mounted to reciprocate at the other side of said support, gearing on said support for driving said counterweight, and connections from said gearing to said saw whereby to drive the saw upon movement of said counterweight and in the opposite direction therefrom.

In testimony whereof I hereunto affix my signature.

HENRY A. MEYER.